(12) United States Patent
Lee et al.

(10) Patent No.: US 11,190,768 B2
(45) Date of Patent: *Nov. 30, 2021

(54) VIDEO ENCODING METHOD WITH SYNTAX ELEMENT SIGNALING OF PACKING OF PROJECTION FACES DERIVED FROM CUBE-BASED PROJECTION AND ASSOCIATED VIDEO DECODING METHOD AND APPARATUS

(71) Applicant: MEDIATEK INC., Hsin-Chu (TW)

(72) Inventors: Ya-Hsuan Lee, Hsinchu (TW); Jian-Liang Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/898,425

(22) Filed: Jun. 10, 2020

(65) Prior Publication Data
US 2021/0006785 A1    Jan. 7, 2021

Related U.S. Application Data

(60) Provisional application No. 62/869,627, filed on Jul. 2, 2019, provisional application No. 62/903,056, filed
(Continued)

(51) Int. Cl.
*H04N 19/119* (2014.01)
*H04N 19/70* (2014.01)
(Continued)

(52) U.S. Cl.
CPC ......... *H04N 19/119* (2014.11); *G06T 3/0087* (2013.01); *H04N 19/167* (2014.11); *H04N 19/184* (2014.11); *H04N 19/70* (2014.11)

(58) Field of Classification Search
None
See application file for complete search history.

(56) References Cited

U.S. PATENT DOCUMENTS 10,404,960 B2 * 9/2019 Budagavi ............. H04N 13/178
10,841,566 B2 * 11/2020 He .................... H04N 21/23439
(Continued)

FOREIGN PATENT DOCUMENTS

| CN | 109246422 A | 1/2019 |
|---|---|---|
| CN | 109417632 A | 3/2019 |

(Continued)

OTHER PUBLICATIONS

Huangfu et al., "Parallel-to-Axis Iniform Cubemap Projection for Omnidirectional Video," 2019 IEEE Int'l Symposium on Circuits and Systems (ISCAS), May 26-29, 2019, pp. 1-5. (Year: 2019).*

(Continued)

*Primary Examiner* — Reza Aghevli
(74) *Attorney, Agent, or Firm* — Winston Hsu (57) ABSTRACT

A video decoding method includes decoding a part of a bitstream to generate a decoded frame, and parsing at least one syntax element from the bitstream. The decoded frame is a projection-based frame that has projection faces packed in a cube-based projection layout. At least a portion of a 360-degree content of a sphere is mapped to the projection faces via cube-based projection. The at least one syntax element is indicative of packing of the projection faces in the cube-based projection layout.

15 Claims, 8 Drawing Sheets

Related U.S. Application Data on Sep. 20, 2019, provisional application No. 62/870,139, filed on Jul. 3, 2019.

(51) Int. Cl.
*H04N 19/167* (2014.01)
*H04N 19/184* (2014.01)
*G06T 3/00* (2006.01)

(56) References Cited

U.S. PATENT DOCUMENTS

| | | |
|---|---|---|
| 2017/0280126 A1 | 9/2017 | Van der Auwera |
| 2018/0103242 A1* | 4/2018 | Budagavi ............. H04N 21/435 |
| 2018/0130175 A1 | 5/2018 | Lin |
| 2018/0192001 A1 | 7/2018 | Boyce |
| 2018/0192074 A1 | 7/2018 | Shih |
| 2018/0268517 A1 | 9/2018 | Coban |
| 2019/0005683 A1 | 1/2019 | Van Der Auwera |
| 2019/0158815 A1* | 5/2019 | He ..................... H04N 21/4728 |
| 2019/0191203 A1 | 6/2019 | Asbun |
| 2019/0200023 A1 | 6/2019 | Hanhart |
| 2019/0215532 A1* | 7/2019 | He ....................... H04N 13/117 |
| 2019/0289316 A1* | 9/2019 | Shih ..................... H04N 19/176 |
| 2020/0045336 A1* | 2/2020 | Xiu ....................... H04N 19/105 |
| 2020/0092582 A1 | 3/2020 | Xiu |
| 2020/0260063 A1 | 8/2020 | Hannuksela |
| 2020/0322632 A1* | 10/2020 | Hanhart ................ H04N 19/85 |
| 2021/0006838 A1* | 1/2021 | Lee ....................... H04N 19/70 |
| 2021/0014472 A1* | 1/2021 | He ....................... H04N 13/117 |

FOREIGN PATENT DOCUMENTS

| | | | |
|---|---|---|---|
| CN | 110521204 A | 11/2019 | |
| TW | 201921950 A | 6/2019 | |
| WO | 2018/035721 A1 | 3/2018 | |
| WO | WO-2018035721 A1 * | 3/2018 | ........... H04N 19/159 |
| WO | 2018/064967 A1 | 4/2018 | |
| WO | 2018/066983 A1 | 4/2018 | |
| WO | WO-2018066983 A1 * | 4/2018 | ............ H04N 19/70 |
| WO | 2018/093851 A1 | 5/2018 | |
| WO | 2018/184528 A1 | 10/2018 | |
| WO | 2018/218028 A1 | 11/2018 | |
| WO | 2019/062714 A1 | 4/2019 | |
| WO | 2019/083943 A1 | 5/2019 | |
| WO | 2019/194573 A1 | 10/2019 | |

OTHER PUBLICATIONS

Ya-Hsuan Lee et al., CE13: Modified Cubemap Projection in JVET-J0019 (Test 5), Joint Video Experts Team (JVET) of ITU-T SG 16 WP 3 and ISO/IEC JTC 1/SC 29/WG 11, Document: JVET-K0131-v1, 11th Meeting: Ljubljana, SI, Jul. 10-18, 2018, pp. 1-5.

"International Search Report" dated Sep. 29, 2020 for International application No. PCT/CN2020/099863, International filing date:Jul. 2, 2020.

"International Search Report" dated Sep. 30, 2020 for International application No. PCT/CN2020/099888, International filing date:Jul. 2, 2020.

"International Search Report" dated Oct. 12, 2020 for International application No. PCT/CN2020/099847, International filing date:Jul. 2, 2020.

Ya-Hsuan Lee et al., AHG6/AHG9:Signalling guard band type for generalized cubemap projection, Joint Video Experts Team (JVET) of ITU-T SG 16 WP 3 and ISO/IEC JTC 1/SC 29/WG 11, 17th Meeting: Brussels, BE, Jan. 7-17, 2020, Document:JVET-Q0343-v1, pp. 1-7, sections 1-3.

Robert Skupin et al., AHG6: 360-degree video related SEI messages, Joint Video Experts Team (JVET) of ITU-T SG 16 WP 3 and ISO/IEC JTC 1/SC 29/WG 11, 16th Meeting: Geneva, CH, Oct. 1-11, 2019, Document:JVET-P0462-v1, pp. 1-2, section 2.

"International Search Report" dated Mar. 25, 2021 for International application No. PCT/CN2020/141395, International filing date:Dec. 30, 2020, pp. 1-10.

* cited by examiner

| gcmp_packing_type | Packing type and position index | gcmp_packing_type | Packing type and position index |
|---|---|---|---|
| 0 | 0 1 2 3 4 5 | 3 | 0 1 2 3 4 5 |
| 1 | 0 1<br>2 3<br>4 5 | 4 | 0 1 2 3 4 |
| 2 | 0 1 2<br>3 4 5 | 5 | 0 1 2 3 4 |

Hemisphere cubemap projection (types 3, 4, 5)

FIG. 4

| gcmp_face_rotation[i] | Rotation angle in degree (anticlockwise) |
|---|---|
| 0 | 0 |
| 1 | 90 |
| 2 | 180 |
| 3 | 270 |

FIG. 5

| gcmp_face_rotation[i] | Rotation angle in degree (clockwise) |
|---|---|
| 0 | 0 |
| 1 | 90 |
| 2 | 180 |
| 3 | 270 |

FIG. 6

| gcmp_face_rotation[i] | Rotation angle in degree (anticlockwise) |
|---|---|
| 0 | 0 |
| 1 | Mirroring horizontally |
| 2 | Rotation by 180 degrees |
| 3 | Rotation by 180 degrees before mirroring horizontally |
| 4 | Rotation by 90 degrees before mirroring horizontally |
| 5 | Rotation by 90 degrees |
| 6 | Rotation by 270 degrees before mirroring horizontally |
| 7 | Rotation by 270 degrees |

FIG. 7

| gcmp_packing_type | Packing type with face index and pre-defined rotation |
|---|---|
| 0 | 5 0 4 3 1 2 |
| 1 | 5 0 4 / 3 1 2 |
| 2 | 5 0 / 4 / 3 1 / 2 |
| 3 | 5 0 4 3 1 2 (rotated) |
| 4 | 3 5 0 / 2 4 (rotated) |
| 5 | 2 4 0 5 3 (rotated) |

FIG. 8

| gcmp_packing_type | Packing type and face index | gcmp_packing_type | Packing type and face index |
|---|---|---|---|
| 0 | 5 0 4 3 1 2 | 3 | 5 0 4 3 1 2 (vertical) |
| 1 | 3 5 0 / 1 0 4 / 2 4 (wait) | 4 | 3 5 0 4 2 (vertical) |
| 2 | 5 0 4 / 3 1 2 | 5 | 3 5 0 4 2 |

FIG. 9

VIDEO ENCODING METHOD WITH SYNTAX ELEMENT SIGNALING OF PACKING OF PROJECTION FACES DERIVED FROM CUBE-BASED PROJECTION AND ASSOCIATED VIDEO DECODING METHOD AND APPARATUS

CROSS REFERENCE TO RELATED APPLICATIONS

This application claims the benefit of U.S. provisional application No. 62/869,627 filed on Jul. 2, 2019, U.S. provisional application No. 62/870,139 filed on Jul. 3, 2019, and U.S. provisional application No. 62/903,056 filed on Sep. 20, 2019. The entire contents of the related applications, including U.S. provisional application No. 62/869,627, U.S. provisional application No. 62/870,139, and U.S. provisional application No. 62/903,056, are incorporated herein by reference.

BACKGROUND

The present invention relates to video encoding and video decoding, and more particularly, to a video encoding method with syntax element signaling of packing of projection faces derived from cube-based projection and associated video decoding method and apparatus.

Virtual reality (VR) with head-mounted displays (HMDs) is associated with a variety of applications. The ability to show wide field of view content to a user can be used to provide immersive visual experiences. A real-world environment has to be captured in all directions, resulting in an omnidirectional video corresponding to a viewing sphere. With advances in camera rigs and HMDs, the delivery of VR content may soon become the bottleneck due to the high bitrate required for representing such a 360-degree content. When the resolution of the omnidirectional video is 4K or higher, data compression/encoding is critical to bitrate reduction.

In general, the omnidirectional video corresponding to a sphere is transformed into a frame with a 360-degree image content represented by projection faces arranged in a 360-degree Virtual Reality (360 VR) projection layout, and then the resulting frame is encoded into a bitstream for transmission. If a configuration of the employed 360 VR projection layout is fixed without allowing any adjustments made thereto, the video encoder has less flexibility for encoding the 360-degree image content. Thus, there is a need for a flexible design which is allowed to determine/select a packing type for the projection faces and signal syntax element(s) associated with packing of the projection faces.

SUMMARY

One of the objectives of the claimed invention is to provide a video encoding method with syntax element signaling of packing of projection faces derived from cube-based projection and associated video decoding method and apparatus.

According to a first aspect of the present invention, an exemplary video encoding method is disclosed. The exemplary video encoding method includes: encoding a projection-based frame to generate a part of a bitstream, wherein at least a portion of a 360-degree content of a sphere is mapped to projection faces via cube-based projection, and the projection-based frame has the projection faces packed in a cube-based projection layout; and signaling at least one syntax element via the bitstream, wherein said at least one syntax element is indicative of packing of the projection faces in the cube-based projection layout.

According to a second aspect of the present invention, an exemplary video decoding method is disclosed. The exemplary video decoding method includes: decoding a part of a bitstream to generate a decoded frame, wherein the decoded frame is a projection-based frame that has projection faces packed in a cube-based projection layout, and at least a portion of a 360-degree content of a sphere is mapped to the projection faces via cube-based projection; and parsing at least one syntax element from the bitstream, wherein said at least one syntax element is indicative of packing of the projection faces in the cube-based projection layout.

According to a third aspect of the present invention, an exemplary electronic device is disclosed. The exemplary electronic device includes a decoding circuit. The decoding circuit is arranged to decode a part of a bitstream to generate a decoded frame, and parse at least one syntax element from the bitstream, wherein the decoded frame is a projection-based frame that has projection faces packed in a cube-based projection layout, at least a portion of a 360-degree content of a sphere is mapped to the projection faces via cube-based projection, and said at least one syntax element is indicative of packing of the projection faces in the cube-based projection layout.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
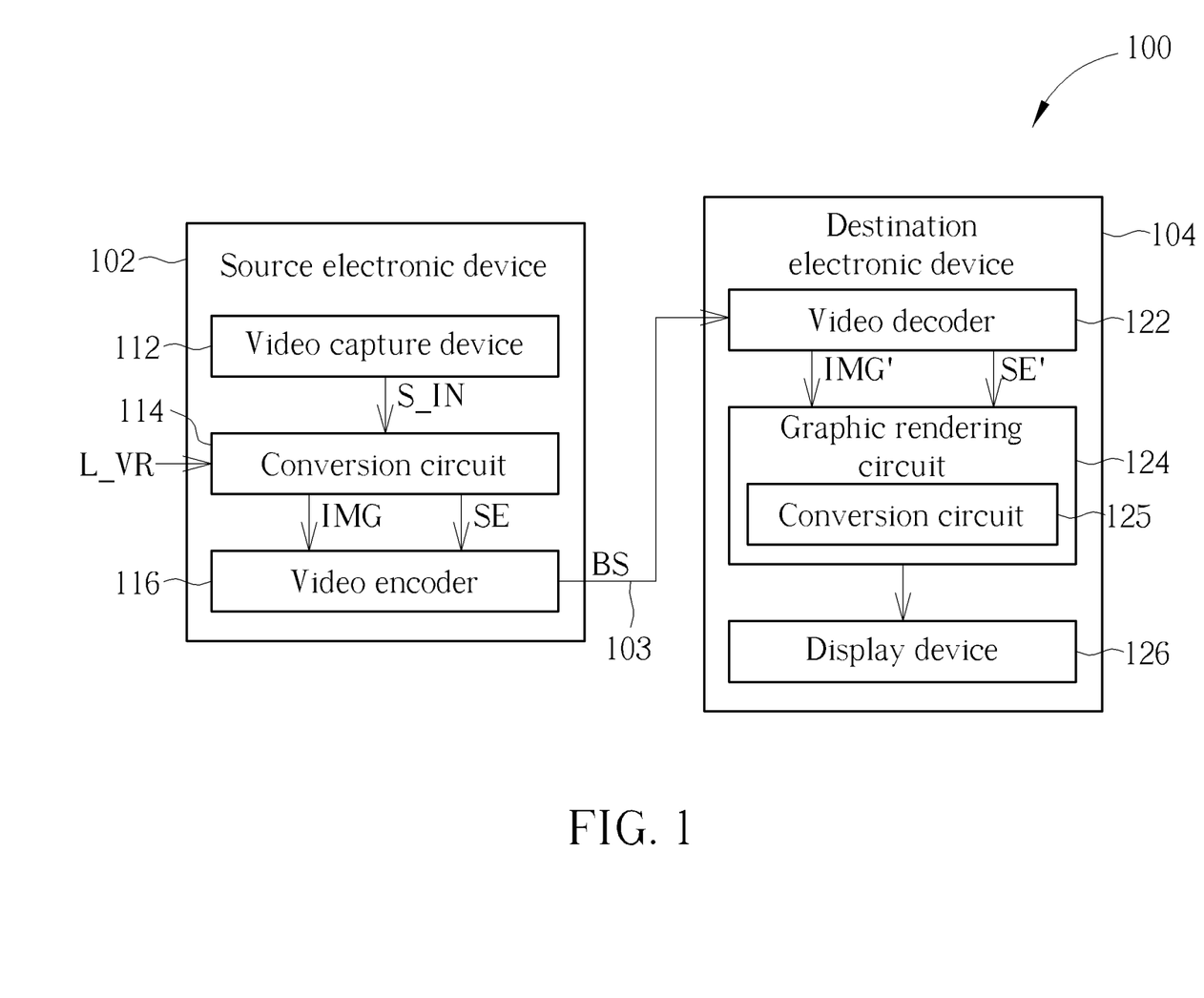
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes a source electronic device 102 and a destination device 104. The source electronic device 102 includes a video capture device 112, a conversion circuit 114, and a video encoder 116. For example, the video capture device 112 may be an omnidirectional camera. The conversion circuit 114 generates a projection-based frame IMG with a 360-degree Virtual Reality (360 VR) projection layout L_VR according to an omnidirectional video frame S_IN corresponding to a sphere, where the omnidirectional video frame S_IN contains a 360-degree content of the sphere. The video encoder 116 is an encoding circuit that encodes the projection-based frame IMG (which has projection faces packed in the 360 VR projection layout L_VR) to generate a part of a bitstream BS, and outputs the bitstream BS to the destination electronic device 104 via a transmission means 103 such as a wired/wireless communication link or a storage medium.

The destination electronic device 104 may be a head-mounted display (HMD) device. As shown in FIG. 1, the destination electronic device 104 includes a video decoder 122, a graphic rendering circuit 124, and a display device 126. The video decoder 122 is a decoding circuit that receives the bitstream BS from the transmission means 103 (e.g., wired/wireless communication link or storage medium), and decodes a part of the received bitstream BS to generate a decoded frame IMG'. In this embodiment, the projection-based frame IMG to be encoded by the video encoder 116 has a 360 VR projection layout L_VR. Hence, after a part of the bitstream BS is decoded by the video decoder 122, the decoded frame (i.e., reconstructed frame) IMG' has the same 360 VR projection layout L_VR. In other words, the decoded frame IMG' is also a projection-based frame that has projection faces packed in the 360 VR projection layout L_VR. The graphic rendering circuit 124 is arranged to drive the display device 126 to show an image content of a viewport area selected by a user. The graphic rendering circuit 124 may include a conversion circuit 125 that is arranged to process a portion of the image content carried by the decoded frame IMG' for obtaining pixel data associated with the image content of the selected viewport area.

In this embodiment, the 360 VR projection layout L_VR is a cube-based projection layout. Hence, at least a portion (i.e., part or all) of a 360-degree content of a sphere is mapped to projection faces via cube-based projection, and the projection faces derived from different faces of a cube are packed in the cube-based projection layout that is employed by the projection-based frame IMG/decoded frame IMG'.

Figure 2:
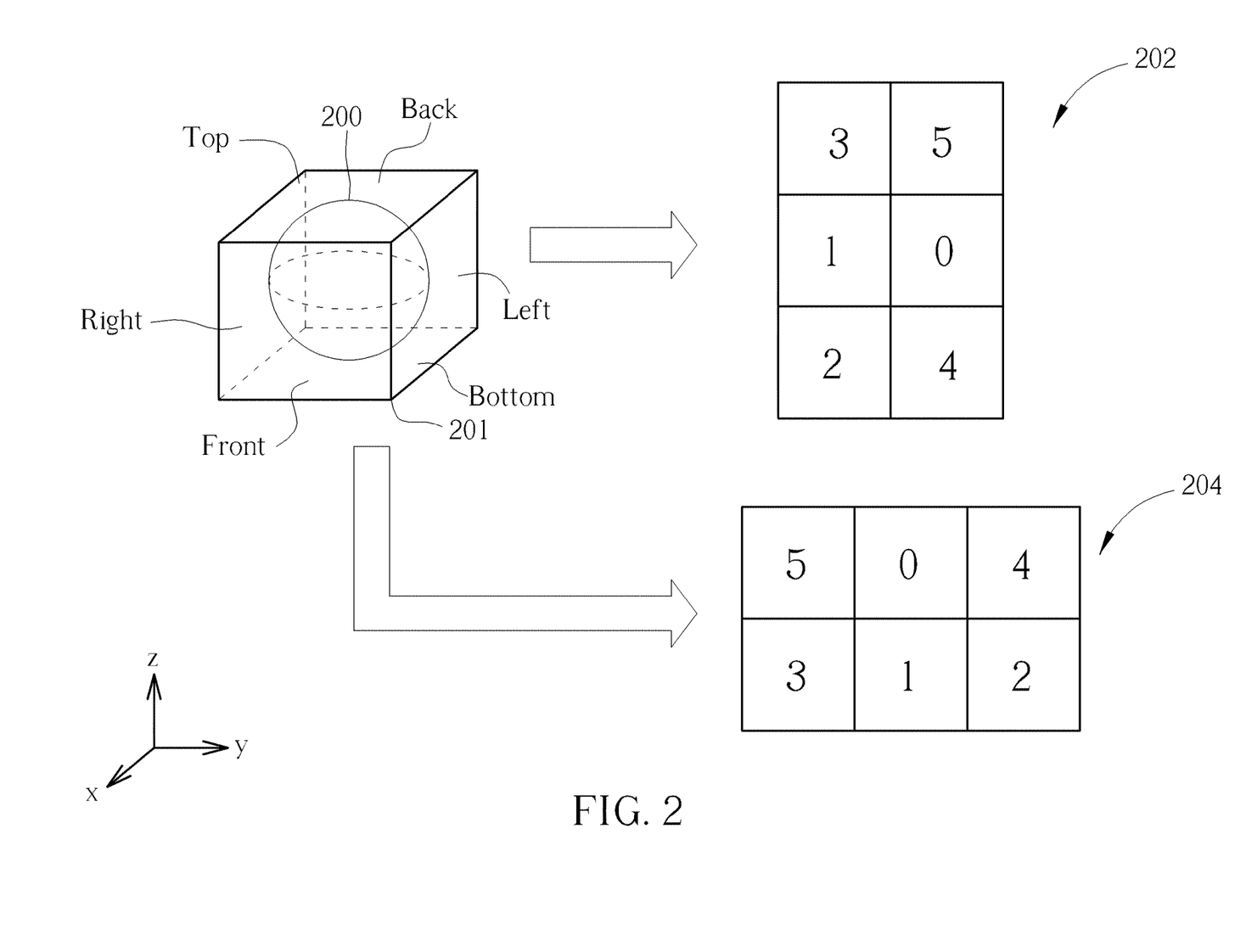
FIG. 2 is a diagram illustrating a cube-based projection according to an embodiment of the present invention.

In one embodiment, cube-based projection with six square projection faces representing full 360°×180° omnidirectional video (i.e., all of a 360-degree content of a sphere) may be employed. Regarding the conversion circuit 114 of the source electronic device 102, cube-based projection is employed to generate square projection faces of a cube in a three-dimensional (3D) space. FIG. 2 is a diagram illustrating a cube-based projection according to an embodiment of the present invention. The whole 360-degree content on the sphere 200 is projected onto six square faces of a cube 201, including a top face (labeled by "Top"), a bottom face (labeled by "Bottom"), a left face (labeled by "Left"), a front face (labeled by "Front"), a right face (labeled by "Right"), and a back face (labeled by "Back"). As shown in FIG. 2, an image content of a north polar region of the sphere 200 is projected onto the top face "Top", an image content of a south polar region of the sphere 200 is projected onto the bottom face "Bottom", and an image content of an equatorial region of the sphere 200 is projected onto the left face "Left", the front face "Front", the right face "Right", and the back face "Back".

In the 3D space that is defined by x-axis, y-axis, and z-axis, each point on six projected faces is located at (x, y, z), where $x,y,z \in [-1,1]$. In this example shown in FIG. 2, the front face "Front" is on an x-plane with x=1, the back face "Back" is on an x-plane with x=−1, the top face "Top" is on a z-plane with z=1, the bottom face "Bottom" is on a z-plane with z=−1, the left face "Left" is on a y-plane with y=1, and the right face "Right" is on a y-plane with y=−1. In an alternative design, the front face "Front" may be on an x-plane with x=1, the back face "Back" may be on an x-plane with x=−1, the top face "Top" may be on a y-plane with y=1, the bottom face "Bottom" may be on a y-plane with y=−1, the right face "Right" is on a z-plane with z=1, and the left face "Left" is on a z-plane with z=−1.

Forward transformation is used to transform from the 3D space (x, y, z) to the 2D plane (u, v). Hence, the top face "Top", bottom face "Bottom", left face "Left", front face "Front", right face "Right", and back face "Back" of the cube 201 in the 3D space are transformed into a top face (labeled by "2"), a bottom face (labeled by "3"), a left face (labeled by "5"), a front face (labeled by "0"), a right face (labeled by "4"), and a back face (labeled by "1") on the 2D plane. Each face is on one 2D plane defined by u-axis and v-axis, and has each point located at (u, v).

Inverse transformation is used to transform from the 2D plane (u, v) to the 3D space (x, y, z). Hence, the top face (labeled by "2"), the bottom face (labeled by "3"), the left face (labeled by "5"), the front face (labeled by "0"), the right face (labeled by "4"), and the back face (labeled by "1") on the 2D plane are transformed into the top face "Top", bottom face "Bottom", left face "Left", front face "Front", right face "Right", and back face "Back" of the cube 201 in the 3D space.

The inverse transformation can be employed by the conversion circuit 114 of the source electronic device 102 for generating the top face "2", bottom face "3", left face "5", front face "0", right face "4", and back face "1". The top face "2", bottom face "3", left face "5", front face "0", right face "4", and back face "1" on the 2D plane that are packed to form the projection-based frame IMG to be encoded by the video encoder 116.

The video decoder 122 receives the bitstream BS from the transmission means 103, and decodes a part of the received bitstream BS to generate the decoded frame IMG' that has the same projection layout L_VR adopted at the encoder side. Regarding the conversion circuit 125 of the destination electronic device 104, forward transformation is used to transform from the 3D space (x, y, z) to the 2D plane (u, v) for determining pixel values of pixels in any of the top face "Top", bottom face "Bottom", left face "Left", front face "Front", right face "Right", and back face "Back". Or the inverse transformation is used to transform from the 2D space (u, v) to the 3D plane (x, y, z) for remapping the sample locations of a projection-based frame to the sphere.

As mentioned above, the top face "2", bottom face "3", left face "5", front face "0", right face "4", and back face "1" are packed to form the projection-based frame IMG. For example, the conversion circuit 114 may select one packing type, such that the projection-based frame IMG may have projected image data arranged in the cube-based projection layout 202. For another example, the conversion circuit 114 may select another packing type, such that the projection-based frame IMG may have projected image data arranged in the cube-based projection layout 204 that is different from the cube-based projection layout 202.

Figure 3:
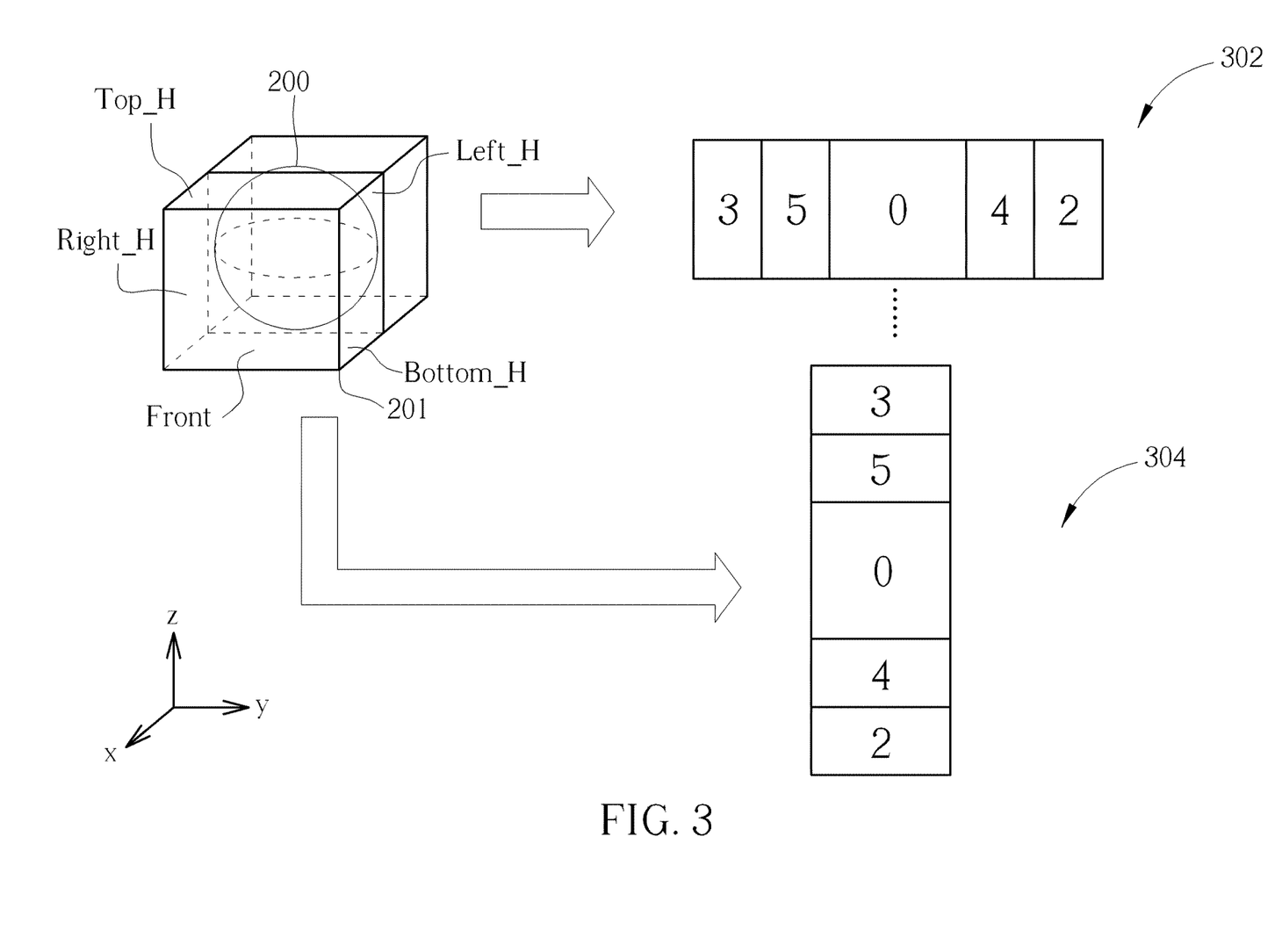
FIG. 3 is a diagram illustrating another cube-based projection according to an embodiment of the present invention.

In another embodiment, cube-based projection with five projection faces (which include one full face and four half faces) representing 180°×180° omnidirectional video (i.e., part of a 360-degree content of a sphere) may be employed. Regarding the conversion circuit 114 of the source electronic device 102, cube-based projection is employed to generate one full face and four half faces of a cube in a 3D space. FIG. 3 is a diagram illustrating another cube-based projection according to an embodiment of the present invention. Only a half of the 360-degree content on the sphere 200 is projected onto faces of a cube 201, including a top half face (labeled by "Top_H"), a bottom half face (labeled by "Bottom_H"), a left half face (labeled by "Left_H"), a front full face (labeled by "Front"), and a right half face (labeled by "Right_H"). As shown in FIG. 3, an image content of a half of a north polar region of the sphere 200 is projected onto the top half face "Top_H", an image content of a half of a south polar region of the sphere 200 is projected onto the bottom half face "Bottom_H", and an image content of a half of an equatorial region of the sphere 200 is projected onto the left half face "Left_H", the front full face "Front", and the right half face "Right_H".

In the 3D space that is defined by x-axis, y-axis, and z-axis, each point on five projected faces is located at (x, y, z), where x,y,z∈[−1,1]. In this example shown in FIG. 3, the front full face "Front" is on an x-plane with x=1, the top half face "Top_H" is on a z-plane with z=1, the bottom half face "Bottom_H" is on a z-plane with z=−1, the left half face "Left_H" is on a y-plane with y=1, and the right half face "Right_H" is on a y-plane with y=−1. In an alternative design, the front full face "Front" may be on an x-plane with x=1, the top half face "Top_H" may be on a y-plane with y=1, the bottom half face "Bottom_H" may be on a y-plane with y=−1, the right half face "Right_H" is on a z-plane with z=1, and the left half face "Left_H" is on a z-plane with z=−1.

Forward transformation is used to transform from the 3D space (x, y, z) to the 2D plane (u, v). Hence, the top half face "Top_H", bottom half face "Bottom_H", left half face "Left_H", front full face "Front", and right half face "Right_H" of the cube 201 in the 3D space are transformed into a top half face (labeled by "2"), a bottom half face (labeled by "3"), a left half face (labeled by "5"), a front full face (labeled by "0"), and a right half face (labeled by "4") on the 2D plane. Each face is on one 2D plane defined by u-axis and v-axis, and has each point located at (u, v). In addition, a size of the front full face (labeled by "0") is twice as large as a size of each of top half face (labeled by "2"), bottom half face (labeled by "3"), left half face (labeled by "5"), and right half face (labeled by "4").

Inverse transformation is used to transform from the 2D plane (u, v) to the 3D space (x, y, z). Hence, the top half face (labeled by "2"), the bottom half face (labeled by "3"), the left half face (labeled by "5"), the front full face (labeled by "0"), and the right half face (labeled by "4") on the 2D plane are transformed into the top half face "Top_H", bottom half face "Bottom_H", left half face "Left_H", front full face "Front", and right half face "Right_H" of the cube 201 in the 3D space.

The inverse transformation can be employed by the conversion circuit 114 of the source electronic device 102 for generating the top half face "2", bottom half face "3", left half face "5", front full face "0", and right half face "4". The top half face "2", bottom half face "3", left half face "5", front full face "0", and right half face "4" on the 2D plane that are packed to form the projection-based frame IMG to be encoded by the video encoder 116.

The video decoder 122 receives the bitstream BS from the transmission means 103, and decodes a part of the received bitstream BS to generate the decoded frame IMG' that has the same projection layout L_VR adopted at the encoder side. Regarding the conversion circuit 125 of the destination electronic device 104, forward transformation is used to transform from the 3D space (x, y, z) to the 2D plane (u, v) for determining pixel values of pixels in any of the top half face "Top_H", bottom half face "Bottom_H", left half face "Left_H", front half face "Front_H", and right half face "Right_H". Or the inverse transformation is used to transform from the 2D space (u, v) to the 3D plane (x, y, z) for remapping the sample locations of a projection-based frame to the sphere.

As mentioned above, the top half face "2", bottom half face "3", left half face "5", front full face "0", and right half face "4" are packed to form the projection-based frame IMG. For example, the conversion circuit 114 may select one packing type, such that the projection-based frame IMG may have projected image data arranged in the cube-based projection layout 302. For another example, the conversion circuit 114 may select another packing type, such that the projection-based frame IMG may have projected image data arranged in the cube-based projection layout 304 that is different from the cube-based projection layout 302. In this embodiment, the front face is selected as the full face that is packed in the cube-based projection layout 302/304. In practice, the full face packed in the cube-based projection layout 302/304 may be any of the top face, the bottom face, the front face, the back face, the left face, and the right face, and the four half faces packed in the cube-based projection layout 302/304 depend on the selection of the full face.

In this embodiment, the conversion circuit 114 determines/selects packing of projection faces derived from cube-based projection (e.g., regular cubemap projection shown in FIG. 2 or hemisphere cubemap projection shown in FIG. 3), and the video encoder 116 signals syntax element(s) SE associated with packing of the projection faces via the bitstream BS. For better understanding of technical features of the present invention, several exemplary syntax signaling methods are described as below. The video encoder 116 may employ one of the proposed syntax signaling methods to signal syntax element(s) SE indicative of configuration information of projection face packing employed by the conversion circuit 114, and the video decoder 122 may parse syntax element(s) SE' signaled by one proposed syntax signaling method employed by the video encoder 116 and may provide the graphic rendering circuit 124 (particularly, conversion circuit 125) with the parsed syntax element(s) SE', such that the graphic rendering circuit 124 (particularly, conversion circuit 125) is informed of the configuration information of projection face packing employed by the conversion circuit 114. In this way, when determining an image content of a viewport area selected by a user, the conversion circuit 125 can refer to the configuration information of projection face packing to perform transformation correctly. Ideally, syntax element(s) SE encoded into the bitstream BS by the video encoder 116 are the same as the syntax element(s) SE' parsed from the bitstream BS by the video decoder 122.

It should be noted that the descriptors in the following exemplary syntax tables specify the parsing process of each syntax element. For example, the syntax elements could be coded by fixed length coding (e.g., u(n)). Taking the descriptor u(n) for example, it describes an unsigned integer using n bits. However, this is for illustrative purposes only, and is not meant to be a limitation of the present invention. In practice, the syntax elements may be coded by fixed length coding (e.g., f(n), i(n) or u(n)) and/or variable length coding (e.g., ce(v), se(v) or ue(v)). The descriptor f(n) means a fixed-pattern bit string using n bits written (from left to right) with the left bit first. The descriptor i(n) means a signed integer using n bits. The descriptor u(n) means an unsigned integer using n bits. The descriptor ce(v) means a context-adaptive variable-length entropy-coded syntax element with the left bit first. The descriptor se(v) means a signed integer Exp-Golomb-coded syntax element with the left bit first. The syntax element ue(v) means an unsigned integer Exp-Golomb-coded syntax element with the left bit first.

In accordance with a first syntax signaling method, the following syntax table may be employed.

|  | Descriptor |
|---|---|
| generalized_cubemap_projection( payloadSize ) { <br> ... <br>   gcmp_packing_type <br>   for( i = 0; i < ( gcmp_packing_type = = 4 \|\| gcmp_packing_type = = 5 ) ? 5 : 6; i + + ) { <br>     gcmp_face_index[ i ] <br>     gcmp_face_rotation[ i ] <br>   } <br> ... <br> } | <br><br>u(3)<br><br><br>u(3)<br>u(2) |

The syntax element gcmp_packing_type specifies a packing type of packing of projection faces in a cube-based projection layout, and further specifies a pre-defined arrangement of position indexes assigned to face positions under the selected packing type.

Figure 4:
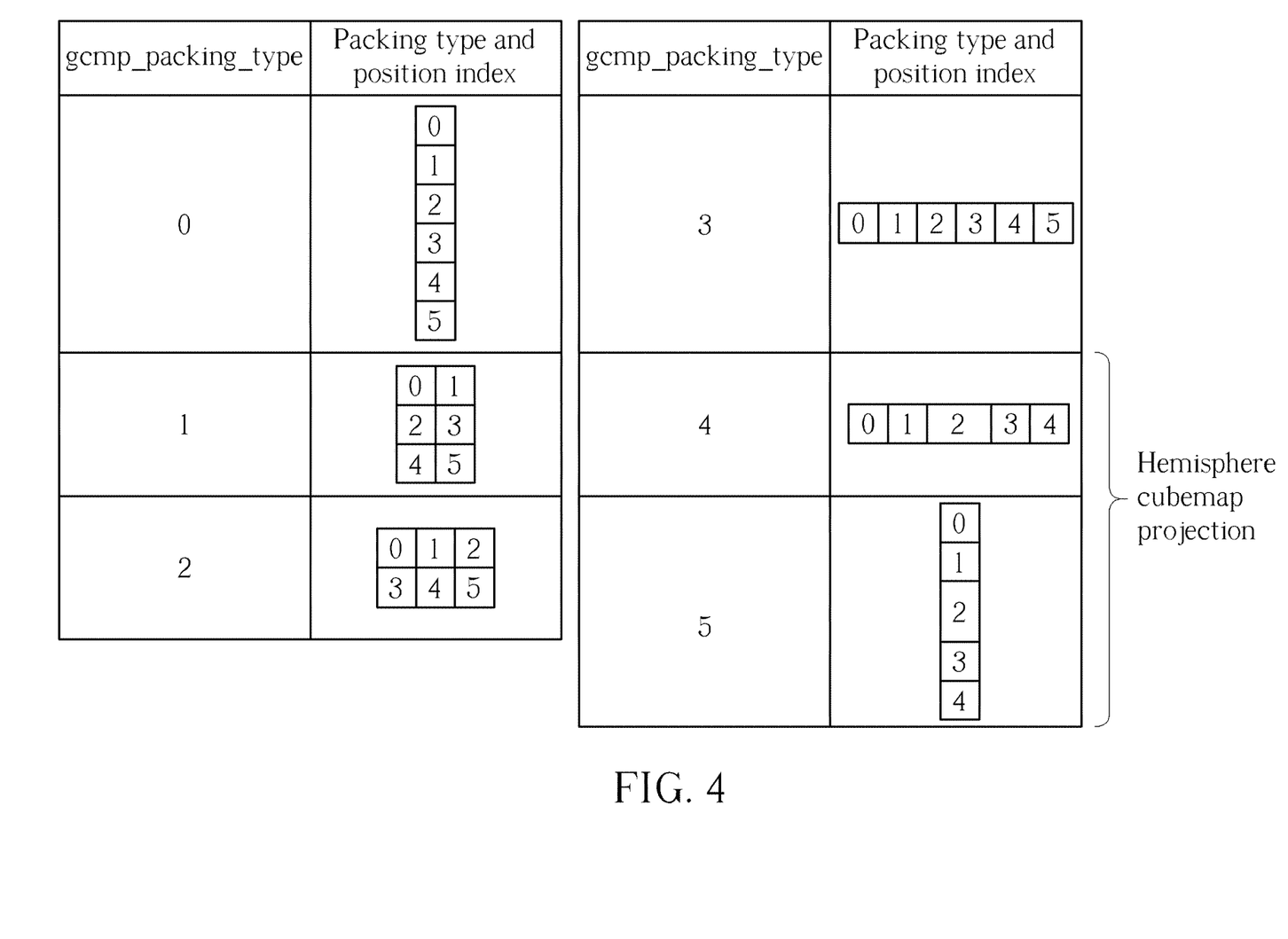
FIG. 4 is a diagram illustrating one specification of syntax element gcmp_packing_type according to an embodiment of the present invention.

FIG. 4 is a diagram illustrating one specification of the syntax element gcmp_packing_type according to an embodiment of the present invention. When the value of gcmp_packing_type is in the range of 0 to 3, inclusive, regular cubemap packing with six faces is used, where each packing type is associated with six face positions assigned with position indexes {0, 1, 2, 3, 4, 5}, respectively. When gcmp_packing_type is 4 or 5, hemisphere cubemap packing with one full face and four half faces is used, where each packing type is associated with five face positions assigned with position indexes {0, 1, 2, 3, 4}, respectively. The value of gcmp_packing_type shall be in the range of 0 to 5, inclusive. Other values for gcmp_packing_type are reserved for future use by ITU-T|ISO/IEC.

The syntax element gcmp_face_index[i] specifies a face index for a position index i under a packing type specified by the syntax element gcmp_packing_type. Taking the regular cubemap projection for example, the front face may be assigned with a face index gcmp_face_index[i]==0, the back face may be assigned with a face index gcmp_face_index [i]==1, the top face may be assigned with a face index gcmp_face_index[i]==2, the bottom face may be assigned with a face index gcmp_face_index[i]==3, the right face may be assigned with a face index gcmp_face_index[i]==4, and the left face may be assigned with a face index gcmp_face_index[i]==5. When the syntax element gcmp_packing_type is set by 0, 1, 2, or 3, the syntax element gcmp_face_index[i] specifies a face index of a projection face (e.g., front face "0", back face "1", top face "2", bottom face "3", right face "4", or left face "5" shown in FIG. 2), where the projection face with the face index specified by the syntax element gcmp_face_index[i] is packed at a face position with the position index i under the selected packing type.

Taking the hemisphere cubemap projection for example, the front full face may be assigned with a face index gcmp_face_index[i]==0, the top half face may be assigned with a face index gcmp_face_index[i]==2, the bottom half face may be assigned with a face index gcmp_face_index [i]==3, the right half face may be assigned with a face index gcmp_face_index[i]==4, and the left half face may be assigned with a face index gcmp_face_index[i]==5. When the syntax element gcmp_packing_type is set by 4 or 5, the syntax element gcmp_face_index[i] specifies a face index of a projection face (e.g., front face "0", back face "1", top face "2", bottom face "3", right face "4", or left face "5" shown in FIG. 3), where the projection face with the face index specified by the syntax element gcmp_face_index[i] is packed at a face position with the position index i under the selected packing type.

Figure 5:
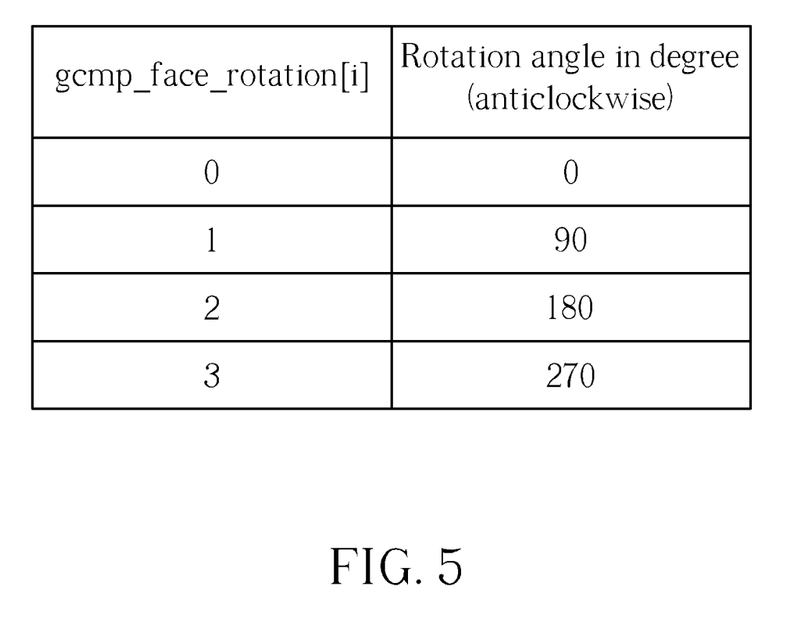
FIG. 5 is a diagram illustrating one specification of syntax element gcmp_face_rotation[i] according to an embodiment of the present invention.

The syntax element gcmp_face_rotation[i] specifies a rotation with a rotation angle that is applied to the projection face packed at the face position with the position index i under the packing type specified by the syntax element gcmp_packing_type. FIG. 5 is a diagram illustrating one specification of the syntax element gcmp_face_rotation[i] according to an embodiment of the present invention. Hence, when a rotation angle of rotation applied to the projection face to be packed at the face position with the position index i is 0°, the syntax element gcmp_face_rotation[i] is set by 0; when the rotation angle of rotation applied to the projection face to be packed at the face position with the position index i is 90° anticlockwise, the syntax element gcmp_face_rotation[i] is set by 1; when the rotation angle of rotation applied to the projection face to be packed at the face position with the position index i is 180° anticlockwise, the syntax element gcmp_face_rotation[i] is set by 2; and when the rotation angle of rotation applied to the projection face to be packed at the face position with the position index i is 270° anticlockwise, the syntax element gcmp_face_rotation[i] is set by 3.

In some embodiments of the present invention, inputs of the rotation process may include width faceWidth and height faceHeight of a projection face to be rotated, and may further include a sample location (hPosFace, vPosFace) within the projection face on a 2D plane; and an output of the rotation process may include a rotated sample location (hPosRot, vPosRot) within the projection face on the 2D plane. The output may be derived as follows:

```
If (gcmp_face_rotation[i] = = 0 ) {
    hPosRot = hPosFace
    vPosRot = vPosFace
} else if (gcmp_face_rotation[i] = = 1 ) {
    hPosRot = vPosFace
    vPosRot = faceWidth − hPosFace
} else if (gcmp_face_rotation[i] = = 2 ) {
```

-continued

```
        hPosRot = faceWidth − hPosFace
        vPosRot = faceHeight − vPosFace
    } else if (gcmp_face_rotation[i] = = 3 ) {
        hPosRot = faceHeight − vPosFace
        vPosRot = hPosFace
    }
```

Figure 6:
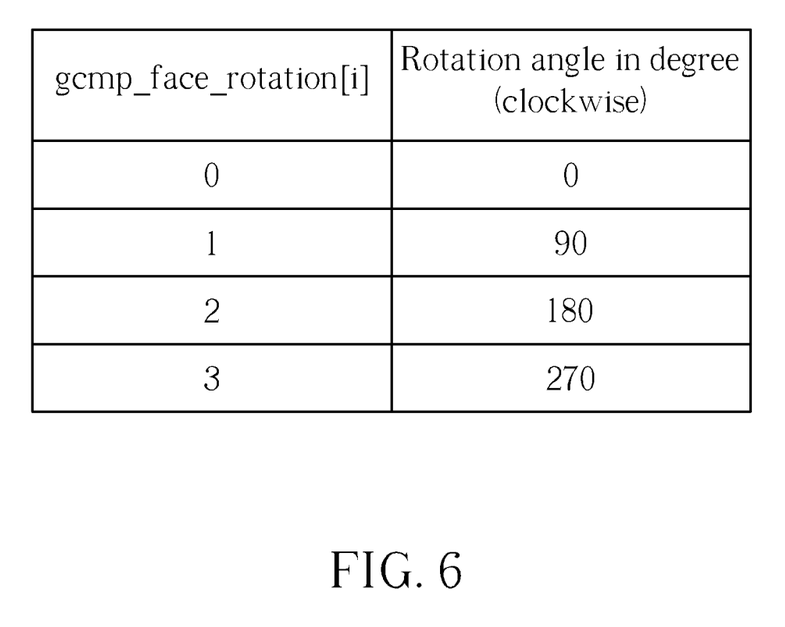
FIG. 6 is a diagram illustrating another specification of syntax element gcmp_face_rotation[i] according to an embodiment of the present invention.
Figure 7:
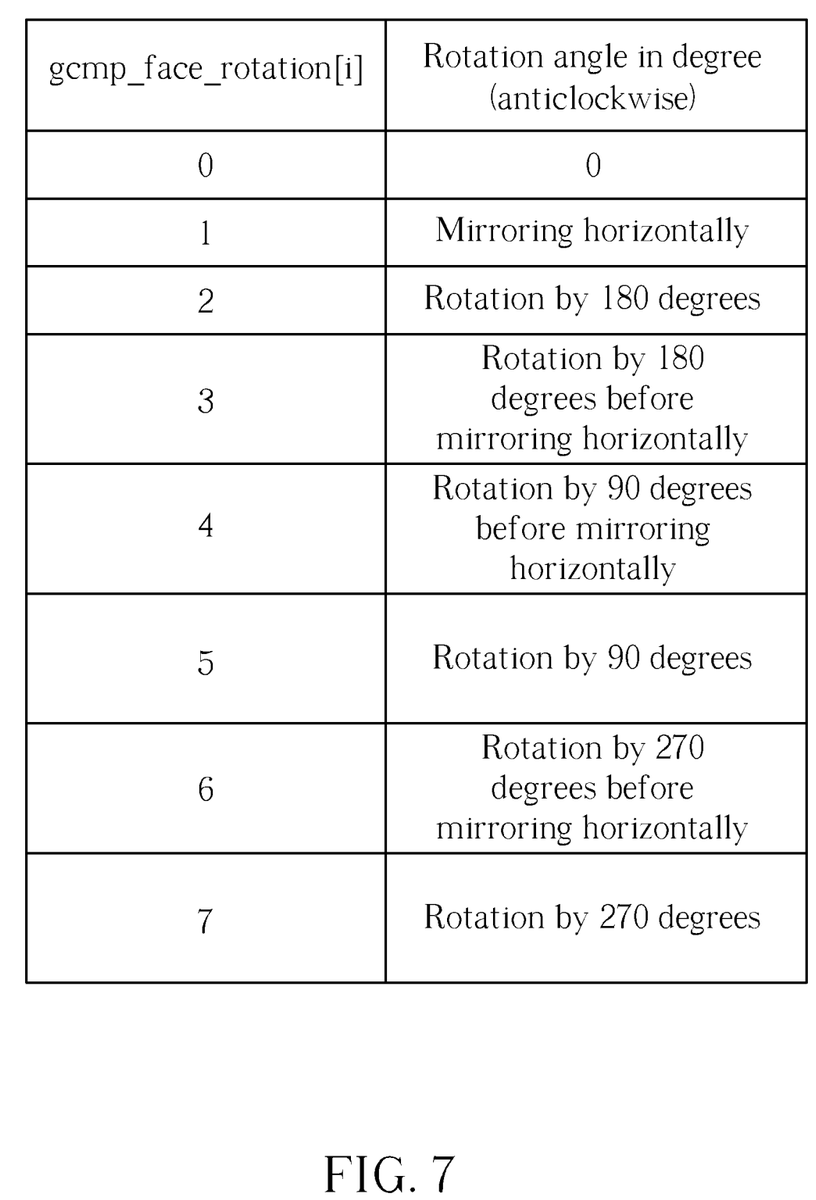
FIG. 7 is a diagram illustrating yet another specification of syntax element gcmp_face_rotation[i] according to an embodiment of the present invention.

In above example, rotation applied to one projection face is defined by a rotation angle in an anticlockwise direction. However, this is for illustrative purposes only, and is not meant to be a limitation of the present invention. In one alternative design, rotation applied to one projection face may be defined by a rotation angle in a clockwise direction. FIG. 6 is a diagram illustrating another specification of the syntax element gcmp_face_rotation[i] according to an embodiment of the present invention. In another alternative design, the rotation applied to one projection face may include mirroring. FIG. 7 is a diagram illustrating yet another specification of the syntax element gcmp_face_rotation[i] according to an embodiment of the present invention.

With regard to the first packing design, distribution of the projection faces packed in the cube-based projection layout and orientation of the projection faces packed in the cube-based projection layout are flexible for each packing type. However, this is for illustrative purposes only, and is not meant to be a limitation of the present invention. Alternatively, distribution of the projection faces packed in the cube-based projection layout and orientation of the projection faces packed in the cube-based projection layout may be fixed for each packing type.

In accordance with a second syntax signaling method, the following syntax table may be employed.

|  | Descriptor |
|---|---|
| generalized_cubemap_projection( payloadSize ) { <br> ... <br>     gcmp_packing_type <br> ... <br> } | <br><br>u(3)<br> |

The syntax element gcmp_packing_type specifies a packing type of packing of projection faces in a cube-based projection layout, and further specifies a pre-defined arrangement of face indexes assigned to face positions under the selected packing type and a pre-defined arrangement of rotations assigned to the face positions under the selected packing type.

Figure 8:
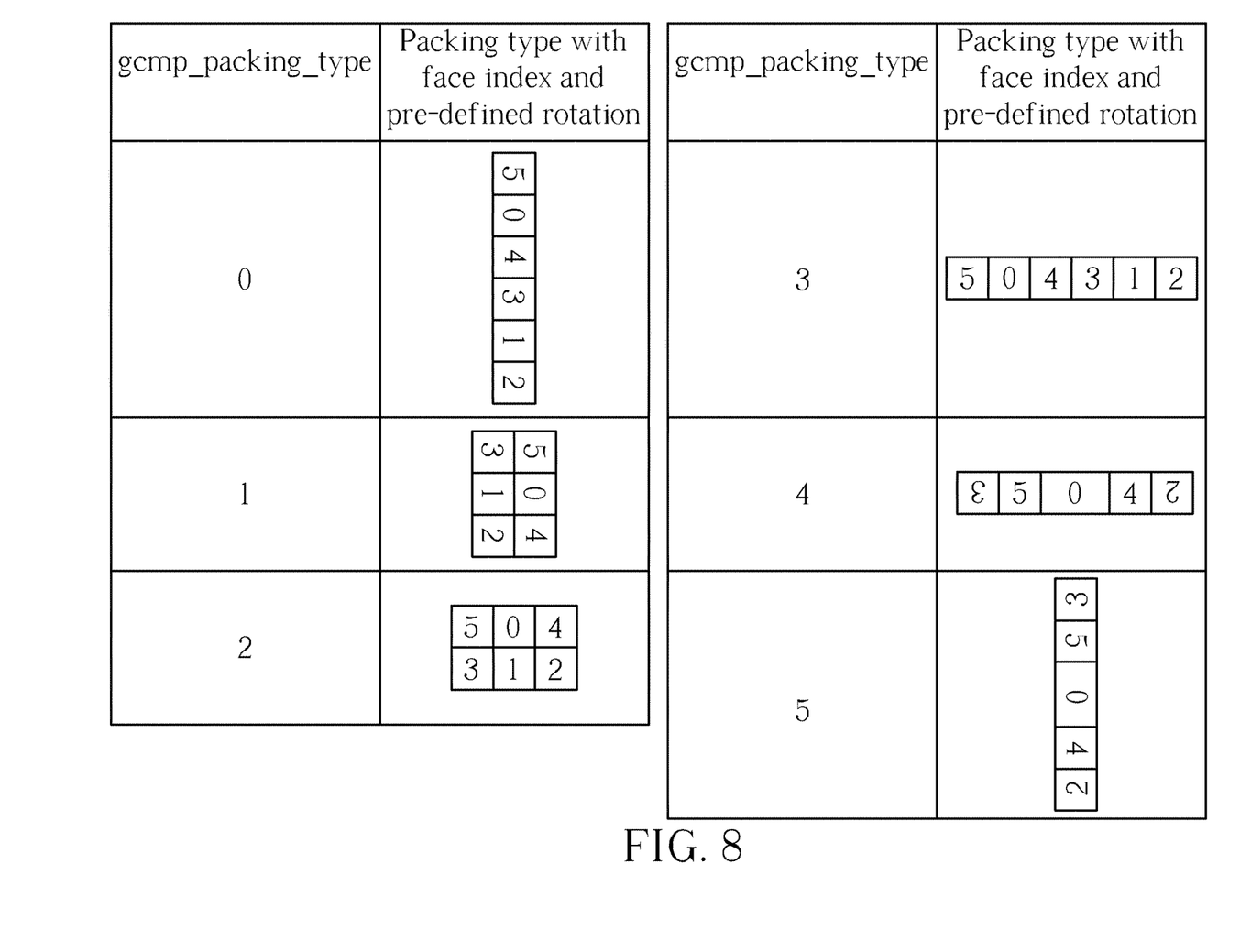
FIG. 8 is a diagram illustrating another specification of syntax element gcmp_packing_type according to an embodiment of the present invention.

FIG. 8 is a diagram illustrating another specification of the syntax element gcmp_packing_type according to an embodiment of the present invention. When the value of gcmp_packing_type is in the range of 0 to 3, inclusive, regular cubemap packing with six faces is used, where each packing type is associated with six face positions assigned with face indexes {0, 1, 2, 3, 4, 5}, respectively. When gcmp_packing_type is 4 or 5, hemisphere cubemap packing with one full face and four half faces is used, where each packing type is associated with five face positions assigned with face indexes {0, 1, 2, 3, 4}, respectively. Specifically, the syntax element gcmp_packing_type specifies a pre-defined arrangement of face indexes assigned to face positions under the selected packing type and a pre-defined arrangement of rotations assigned to the face positions under the selected packing type, where a projection face with a face index is packed at a face position that is assigned with the face index, and a rotation with a pre-defined rotation angle is applied to the projection face packed at the face position that is assigned with the face index. In other words, positions of projection faces and rotations of the projection faces are not adjustable for a selected packing type.

With regard to the second packing design, distribution of the projection faces packed in the cube-based projection layout and orientation of the projection faces packed in the cube-based projection layout are fixed for each packing type. However, this is for illustrative purposes only, and is not meant to be a limitation of the present invention. Alternatively, distribution of the projection faces packed in the cube-based projection layout is fixed for each packing type, but orientation of the projection faces packed in the cube-based projection layout may be flexible for each packing type.

In accordance with a third syntax signaling method, the following syntax table may be employed.

|  | Descriptor |
|---|---|
| generalized_cubemap_projection( payloadSize ) { <br> ... <br>     gcmp_packing_type <br>     for (i = 0; i < ( gcmp_packing_type = = 4 \|\| gcmp_packing_type = = 5 ) ? 5 : 6; i+ + ) { <br>         gcmp_face_rotation[ i ] <br>         ... <br>     } <br> } | <br><br>u(3)<br><br><br>u(2)<br><br> |

The syntax element gcmp_packing_type specifies a packing type of packing of projection faces in a cube-based projection layout, and further specifies a pre-defined arrangement of face indexes assigned to face positions under the selected packing type.

Figure 9:
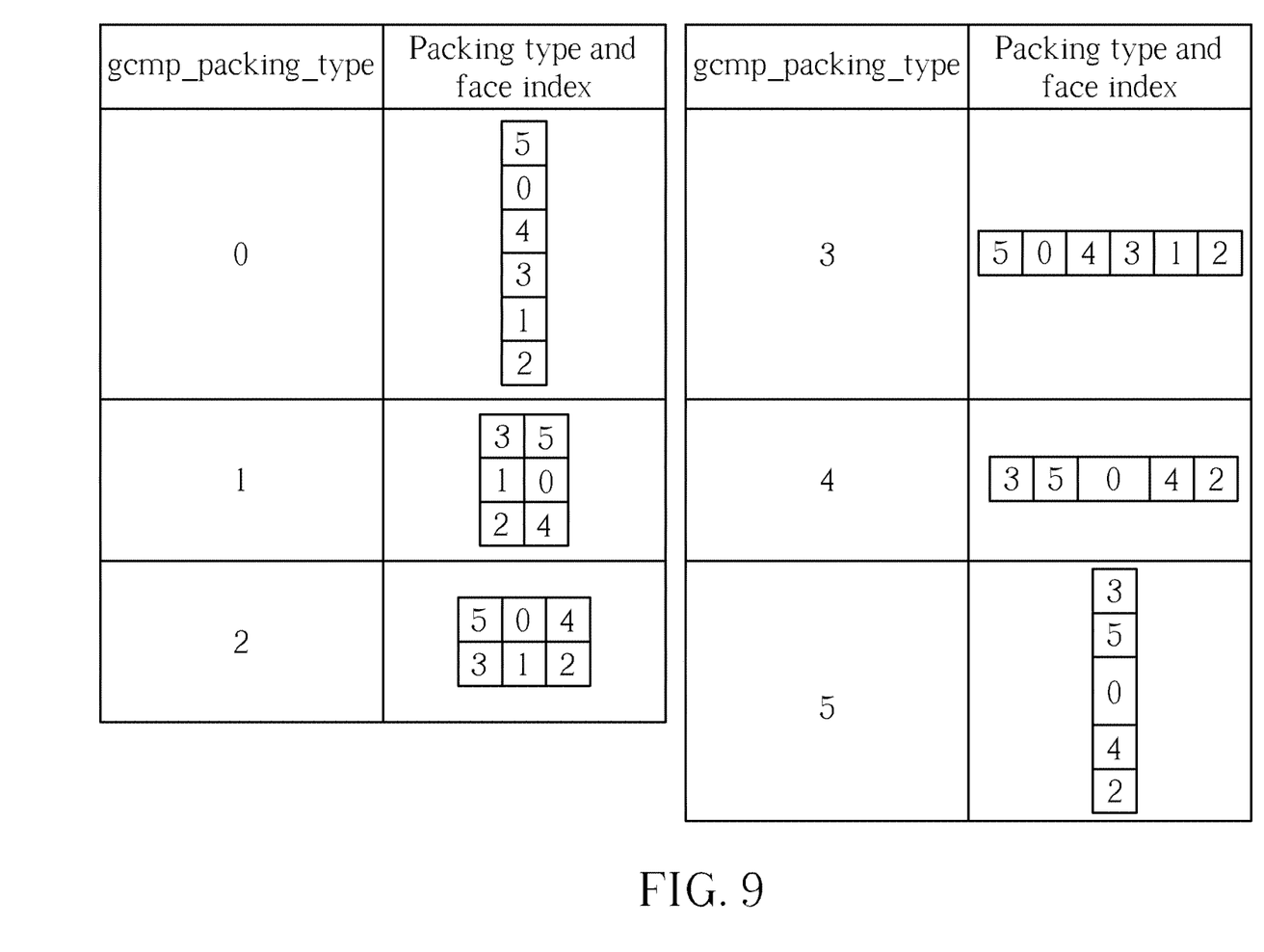
FIG. 9 is a diagram illustrating yet another specification of syntax element gcmp_packing_type according to an embodiment of the present invention.

FIG. 9 is a diagram illustrating yet another specification of the syntax element gcmp_packing_type according to an embodiment of the present invention. When the value of gcmp_packing_type is in the range of 0 to 3, inclusive, regular cubemap packing with six faces is used, where each packing type is associated with six face positions assigned with face indexes {0, 1, 2, 3, 4, 5}, respectively. When gcmp_packing_type is 4 or 5, hemisphere cubemap packing with one full face and four half faces is used, where each packing type is associated with five face positions assigned with face indexes {0, 1, 2, 3, 4}, respectively. Specifically, the syntax element gcmp_packing_type specifies a pre-defined arrangement of face indexes assigned to face positions under the selected packing type, where a projection face with a face index is packed at a face position that is assigned with the face index.

The syntax element gcmp_face_rotation[i] specifies a rotation with a rotation angle that is applied to the projection face packed at the face position with the face index i under the selected packing type. For example, one of the specifications of syntax element gcmp_face_rotation[i] as shown in FIGS. 5-7 may be employed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video decoding method comprising:
   decoding a part of a bitstream to generate a decoded frame, wherein the decoded frame is a projection-based frame that has projection faces packed in a cube-based projection layout, and at least a portion of a 360-degree content of a sphere is mapped to the projection faces via cube-based projection; and
   parsing at least one syntax element from the bitstream, wherein said at least one syntax element is indicative of packing of the projection faces in the cube-based projection layout;
   wherein said at least one syntax element comprises:
   a first syntax element, arranged to specify a packing type of said packing of the projection faces in the cube-based projection layout, and further arranged to specify a pre-defined arrangement of position indexes assigned to face positions under the packing type; and
   a second syntax element for one of the position indexes, wherein the second syntax element is arranged to specify a face index of one of the projection faces, and said one of the projection faces is packed at a face position with said one of the position indexes.

2. The video decoding method of claim 1, wherein packing of the projection faces is selected from a group consisting of packing of regular cubemap projection faces and packing of hemisphere cubemap projection faces.

3. The video decoding method of claim 2, wherein the hemisphere cubemap projection faces comprise a first projection face and four second projection faces, the first projection face has a first size, each of the four second projection faces has a second size, and the first size is larger than the second size.

4. The video decoding method of claim 1, wherein said at least one syntax element further comprises a third syntax element for said one of the position indexes, and the third syntax element is arranged to specify a rotation with a rotation angle that is applied to said one of the projection faces packed at the face position with said one of the position indexes.

5. A video decoding method comprising:
   decoding a part of a bitstream to generate a decoded frame, wherein the decoded frame is a projection-based frame that has projection faces packed in a cube-based projection layout, and at least a portion of a 360-degree content of a sphere is mapped to the projection faces via cube-based projection; and
   parsing at least one syntax element from the bitstream, wherein said at least one syntax element is indicative of packing of the projection faces in the cube-based projection layout;
   wherein said at least one syntax element comprises:
   a first syntax element, arranged to specify a packing type of said packing of the projection faces in the cube-based projection layout, and further arranged to specify a pre-defined arrangement of face indexes assigned to face positions under the packing type, where one of the projection faces with a face index is packed at one of the face positions that is assigned with the face index.

6. The video decoding method of claim 5, wherein the first syntax element is further arranged to specify a pre-defined arrangement of rotations assigned to the face positions under the packing type, where a rotation with a pre-defined rotation angle is applied to said one of the projection faces packed at said one of the face positions.

7. The video decoding method of claim 5, wherein said at least one syntax element further comprises a second syntax element for the face index, and the second syntax element is arranged to specify a rotation with a rotation angle that is applied to said one of the projection faces with the face index.

8. An electronic device comprising:
   a decoding circuit, arranged to decode a part of a bitstream to generate a decoded frame, and parse at least one syntax element from the bitstream;
   wherein the decoded frame is a projection-based frame that has projection faces packed in a cube-based projection layout, at least a portion of a 360-degree content of a sphere is mapped to the projection faces via cube-based projection, and said at least one syntax element is indicative of packing of the projection faces in the cube-based projection layout;
   wherein said at least one syntax element comprises:
   a first syntax element, arranged to specify a packing type of said packing of the projection faces in the cube-based projection layout, and further arranged to specify a pre-defined arrangement of position indexes assigned to face positions under the packing type; and
   a second syntax element for one of the position indexes, wherein the second syntax element is arranged to specify a face index of one of the projection faces, and said one of the projection faces is packed at a face position with said one of the position indexes.

9. The electronic device of claim 8, wherein packing of the projection faces is selected from a group consisting of packing of regular cubemap projection faces and packing of hemisphere cubemap projection faces.

10. The electronic device of claim 9, wherein the hemisphere cubemap projection faces comprise a first projection face and four second projection faces, the first projection face has a first size, each of the four second projection faces has a second size, and the first size is larger than the second size.

11. The electronic device of claim 8, wherein said at least one syntax element further comprises a third syntax element for said one of the position indexes, and the third syntax element is arranged to specify a rotation with a rotation angle that is applied to said one of the projection faces packed at the face position with said one of the position indexes.

12. An electronic device comprising:
   a decoding circuit, arranged to decode a part of a bitstream to generate a decoded frame, and parse at least one syntax element from the bitstream,
   wherein the decoded frame is a projection-based frame that has projection faces packed in a cube-based projection layout, at least a portion of a 360-degree content of a sphere is mapped to the projection faces via cube-based projection, and said at least one syntax element is indicative of packing of the projection faces in the cube-based projection layout;
   wherein said at least one syntax element comprises:
   a first syntax element, arranged to specify a packing type of said packing of the projection faces in the cube-based projection layout, and further arranged to specify a pre-defined arrangement of face indexes assigned to face positions under the packing type, where one of the projection faces with a face index is packed at one of the face positions that is assigned with the face index.

13. The electronic device of claim 12, wherein the first syntax element is further arranged to specify a pre-defined arrangement of rotations assigned to the face positions under the packing type, where a rotation with a pre-defined rotation angle is applied to said one of the projection faces packed at said one of the face positions.

14. The electronic device of claim 12, wherein said at least one syntax element further comprises a second syntax element for the face index, and the second syntax element is arranged to specify a rotation with a rotation angle that is applied to said one of the projection faces with the face index.

15. A video encoding method comprising:
    encoding a projection-based frame to generate a part of a bitstream, wherein at least a portion of a 360-degree content of a sphere is mapped to projection faces via cube-based projection, and the projection-based frame has the projection faces packed in a cube-based projection layout; and
    signaling at least one syntax element via the bitstream, wherein said at least one syntax element is indicative of packing of the projection faces in the cube-based projection layout;
    wherein said at least one syntax element comprises:
    a first syntax element, arranged to specify a packing type of said packing of the projection faces in the cube-based projection layout, and further arranged to specify a pre-defined arrangement of position indexes assigned to face positions under the packing type; and
    a second syntax element for one of the position indexes, wherein the second syntax element is arranged to specify a face index of one of the projection faces, and said one of the projection faces is packed at a face position with said one of the position indexes.

* * * * *